United States Patent [19]

Grinderslev

[11] Patent Number: 5,208,887
[45] Date of Patent: May 4, 1993

[54] METHOD AND APPARATUS FOR TERMINATING A FIBER-OPTIC CABLE WITHOUT ADHESIVE

[75] Inventor: Soren Grinderslev, Shelton, Conn.

[73] Assignee: AMP Incorporated, Harrisburg, Pa.

[21] Appl. No.: 778,898

[22] PCT Filed: Jul. 11, 1990

[86] PCT No.: PCT/US90/03964

§ 371 Date: Jan. 10, 1992

§ 102(e) Date: Jan. 10, 1992

Related U.S. Application Data

[63] Continuation-in-part of Ser. No. 574,852, Aug. 30, 1990, Pat. No. 5,008,804, and a continuation-in-part of Ser. No. 467,915, Jan. 22, 1990, abandoned.

[51] Int. Cl.$^5$ .............................................. G02B 6/36
[52] U.S. Cl. ........................................ 385/81; 385/62; 385/86
[58] Field of Search ...................... 385/81, 76, 86, 62

[56] References Cited

U.S. PATENT DOCUMENTS

| | | | |
|---|---|---|---|
| 3,946,467 | 3/1976 | Lukas et al. | 24/260 |
| 3,999,837 | 12/1976 | Bowen et al. | 350/96 C |
| 4,107,242 | 8/1978 | Runge | 264/1 |
| 4,140,366 | 2/1979 | Makuch et al. | 350/96.22 |
| 4,167,303 | 9/1979 | Bowen et al. | 350/96.21 |
| 4,190,317 | 2/1980 | Makuch | 350/96.20 |
| 4,236,787 | 12/1980 | Iacono et al. | 350/96.21 |
| 4,252,406 | 2/1981 | Ryan, Jr. et al. | 350/96.21 |
| 4,354,731 | 10/1982 | Mouissie | 350/96.21 |
| 4,440,471 | 4/1984 | Knowles | 350/96.21 |
| 4,512,630 | 4/1985 | Runge | 350/96.20 |
| 4,607,911 | 8/1986 | Rhodes | 350/96.20 |
| 4,645,296 | 2/1987 | Cattin et al. | 350/96.21 |
| 4,648,688 | 3/1987 | Ashman et al. | 350/96.20 |
| 4,657,340 | 4/1987 | Tanaka et al. | 350/96.20 |
| 4,679,895 | 7/1987 | Huber | 350/96.20 |
| 4,696,540 | 9/1987 | Adams et al. | 350/96.21 |
| 4,747,656 | 5/1988 | Miyahara et al. | 350/96.20 |
| 4,747,658 | 5/1988 | Borsuk et al. | 359/96.28 |
| 4,787,699 | 11/1988 | Moulin | 350/96.21 |
| 4,790,622 | 12/1988 | Levinson et al. | 350/96.20 |
| 4,872,736 | 10/1989 | Myers et al. | 350/96.20 |
| 5,088,804 | 2/1992 | Ginderslev | 385/81 |

FOREIGN PATENT DOCUMENTS

| | | |
|---|---|---|
| 0053914 | 6/1982 | European Pat. Off. |
| 159198 | 10/1985 | European Pat. Off. |
| 177937 | 4/1986 | European Pat. Off. |
| 0210921 | 2/1987 | |
| 2629925 | 10/1989 | France |
| 8609494 | 2/1979 | Sweden |
| 8601601 | 3/1986 | World Int. Prop. O. |
| 9001714 | 2/1990 | World Int. Prop. O. |

OTHER PUBLICATIONS

Optical Connector in a Delivery System for Medical Applications, Brenci et al., 100 Alta Frequenza pp. 223–225, Jul./Aug. 1981.
Patent Abstracts of Japan, vol. 8, No. 109 JPA5918915 (Matsushita Denk K.K.), Jan. 31, 1984, see the abstract.

Primary Examiner—John D. Lee
Assistant Examiner—S. W. Barns
Attorney, Agent, or Firm—Lahive & Cockfield

[57] ABSTRACT

An adhesiveless optical fiber termination employs an outer element (14, 76, 90) having a through passage (18, 80, 86) that receives an optical fiber (60, 72, 84). A tubular inner element (12, 78, 92) fits over the cable and telescopically seats in the passage of the outer element. An elastomeric compressive system (16, 74, 94) is seated within the passage substantially encircling the optical fiber and is radially inwardly deformed into secure engagement with the optical fiber therein in response to compressive engagement between the outer element and the inner element.

24 Claims, 5 Drawing Sheets

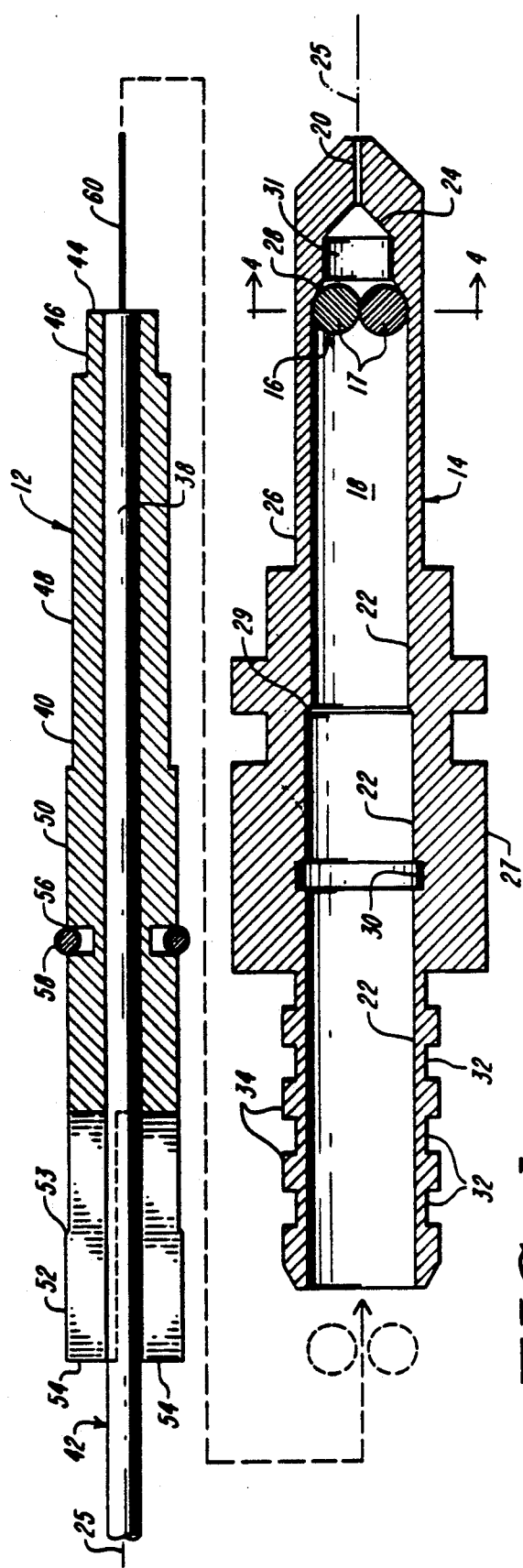
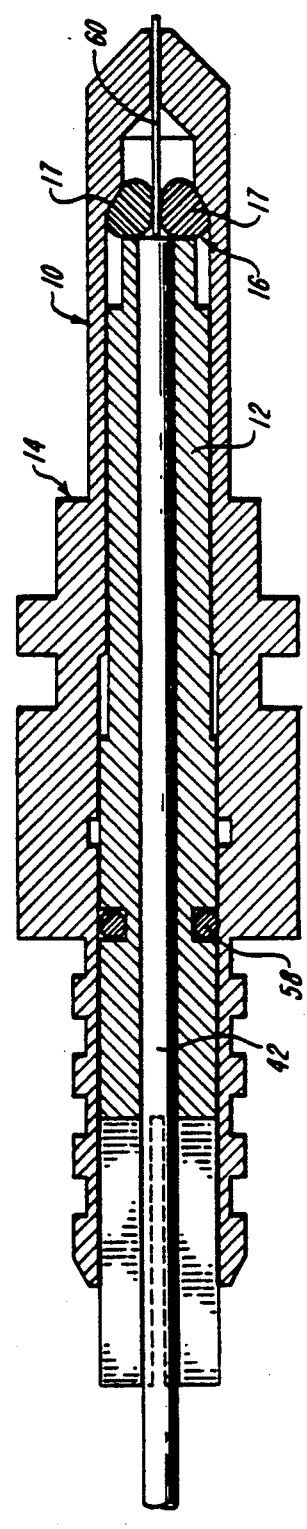
FIG. 1
FIG. 2

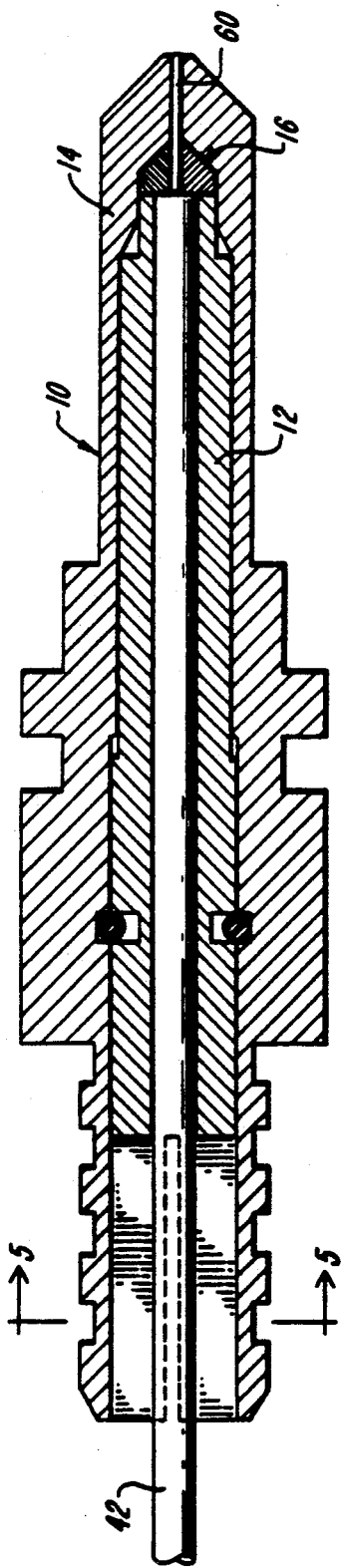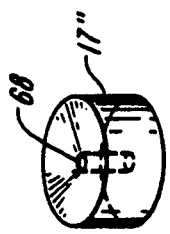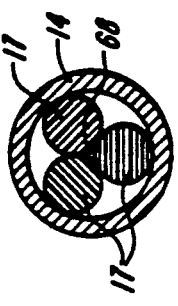

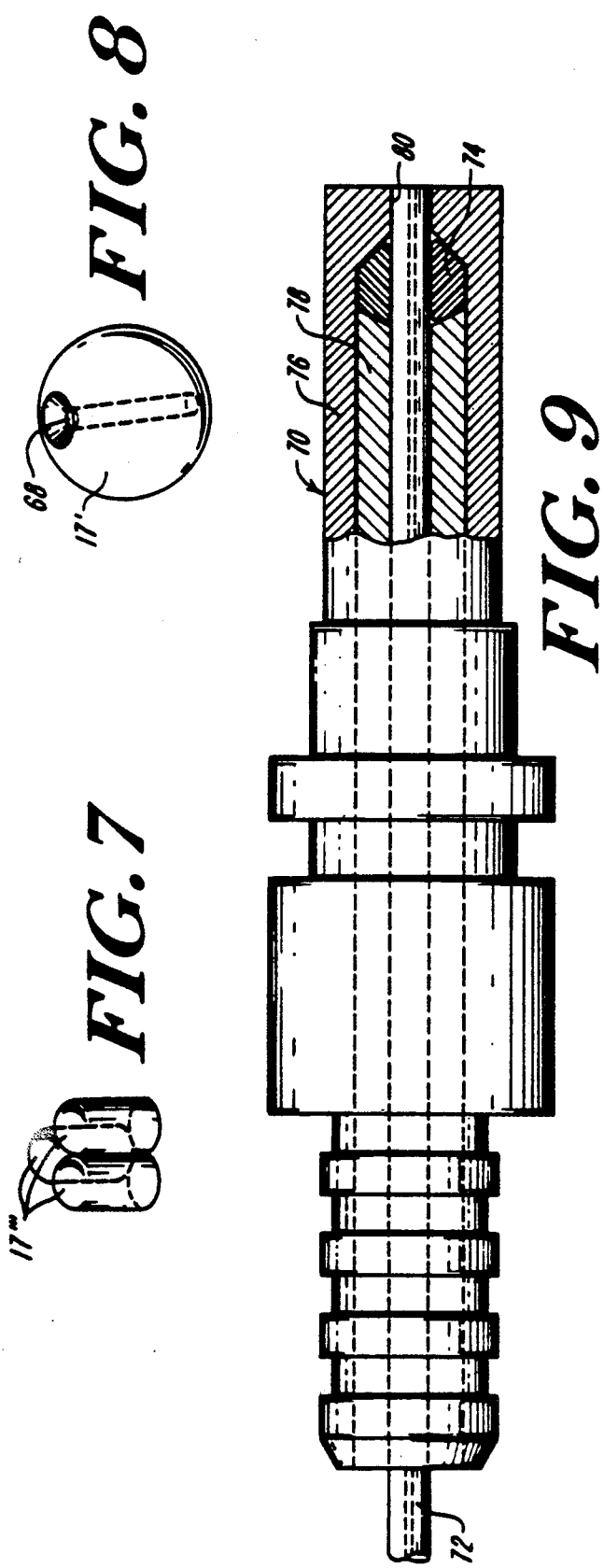

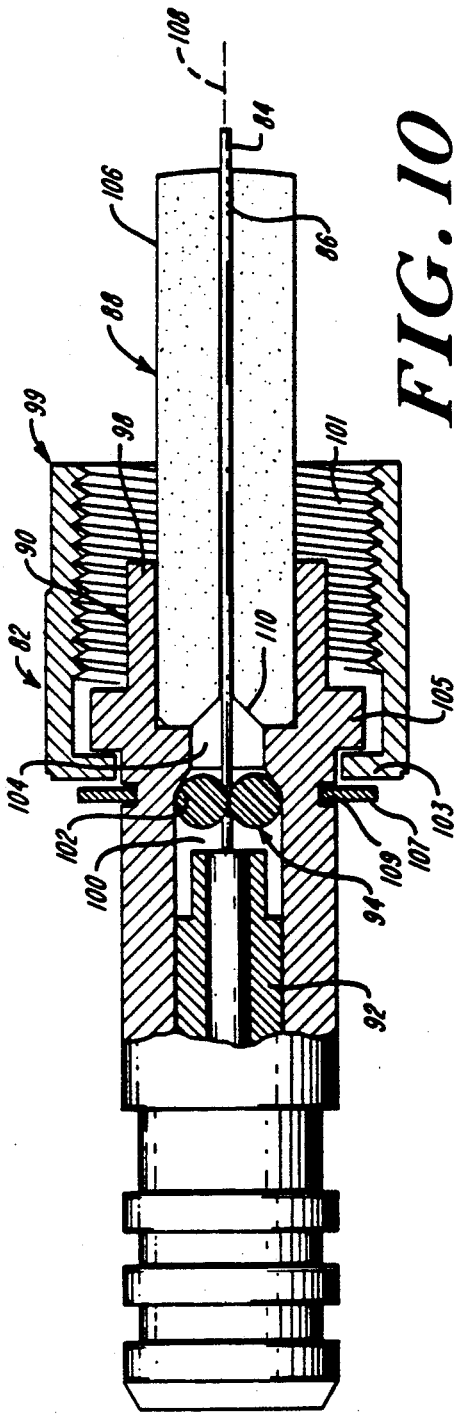
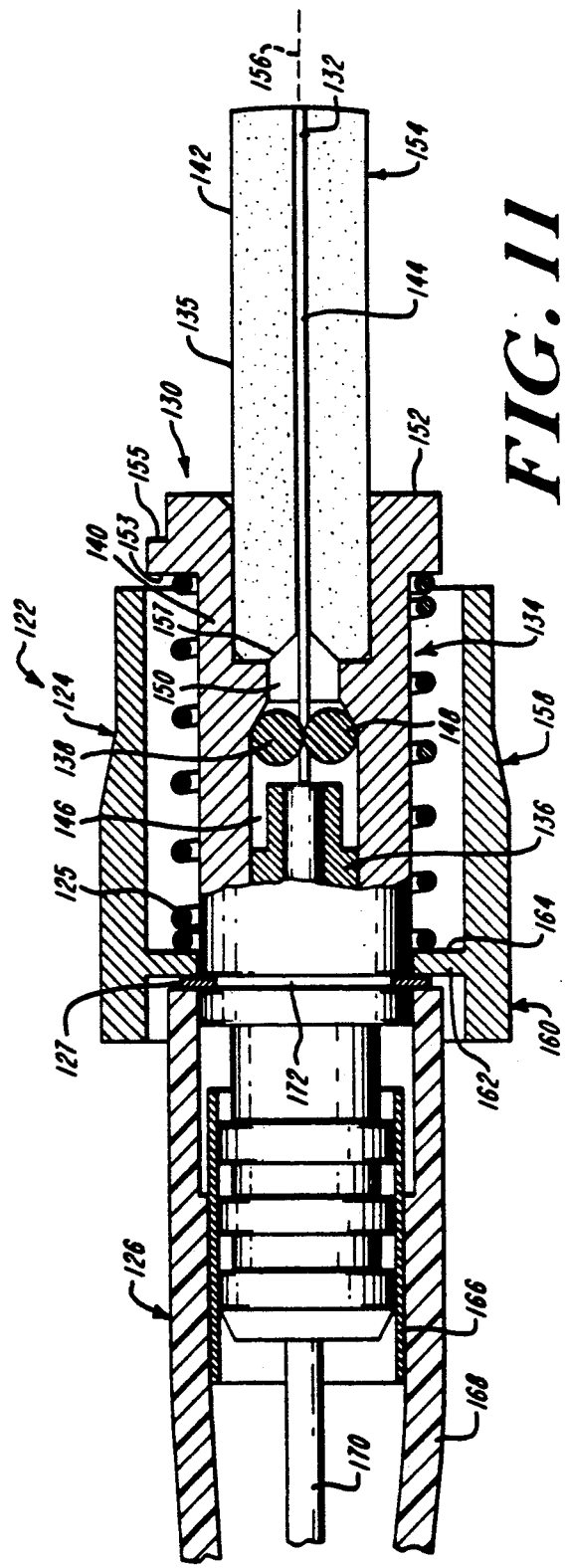

METHOD AND APPARATUS FOR TERMINATING A FIBER-OPTIC CABLE WITHOUT ADHESIVE

CROSS-REFERENCE

This application is a continuation-in-part of co-pending Ser. No. 574,852, filed Aug. 8, 1990, and now issued U.S. Pat. No. 5,008,804 for METHOD AND APPARATUS FOR TERMINATING A FIBER-OPTIC CABLE WITHOUT ADHESIVE, and of the commonly-assigned and co-pending and now-abandoned U.S. patent application Ser. No. 467,915 filed Jan. 22, 1990, for METHOD AND APPARATUS FOR TERMINATING A FIBER-OPTIC CABLE WITHOUT ADHESIVE.

BACKGROUND OF THE INVENTION

This invention relates to an apparatus and method for terminating, including joining and splicing, light transmitting signal cables having at least one optical fiber. It relates in particular to an apparatus and method that secure a fiber optic cable by mechanical means, and without the need for an adhesive.

Fiber optic communication cables typically include at least one light transmitting optical fiber clad in an optically insulating material. The cladding protects the glass fiber, and prevents dispersion of light out of the optical fiber. The fiber optic cable usually has a protective external buffer, typically of a plastic material, which may or may not be removed to terminate the cable.

The use of fiber optic systems creates a need for a connector capable of coupling segments of light-conductive cable with minimal detriment to light transmission. To achieve efficient light transfer between fiber optic cables, the optical fibers must be axially and angularly aligned to high precision, as well as spaced close together with or without touching, whichever is specified. The alignment and spacing requirements are exceedingly demanding, due to the minute, micron-size diameter of the optical fibers being connected, coupled or otherwise terminated.

Both mechanical and adhesive clamp systems have been employed to achieve the requisite fiber alignment. Prior mechanical clamps may subject the optical fiber to excessive clamping or gripping pressures causing breakage or damage and, thus, reduced light transmission. Insufficient gripping pressure on the other hand, permits undesirable movement of the optical fiber. These problems are particularly likely to occur in environments where significant temperature variations cause expansion and contraction, which result in clamping pressure variations.

Prior terminations employing adhesives, like prior mechanical terminations, can provide accurate positioning of the fiber and polishing of its end without displacement. However, one disadvantage of adhesive clamps is that they require the correct application, and subsequent curing, of the adhesive.

It is accordingly an object of this invention to provide an improved method and apparatus for terminating a fiber optic cable by mechanical action, without the need for an adhesive.

It is another object of the invention to provide a method and apparatus for terminating a fiber optic cable with mechanical action and with minimal risk of subjecting the cable to damaging or destructive forces.

It is also an object of the invention to provide a method and apparatus for terminating a fiber optic cable that is uniformly effective under a variety of environmental conditions.

Further objects of the invention include providing a fiber optic cable connector of the above character that is economical to manufacture, easy to use, and that provides reliable high level optical signal transmission.

Other general and specific objects of the invention will in part be obvious and will in part appear hereinafter.

SUMMARY OF THE INVENTION

The invention attains the foregoing objectives with a connector apparatus that includes a terminating element, an actuating element, and a compressive system. The apparatus and method of the invention align and terminate an optical fiber such that the secured fiber is concentrically disposed with respect to the outer dimension of the terminating element.

The terminating element is typically a connector outer housing or shell and has a central passage through which a fiber optic cable extends. The actuating element is tubular to fit over the cable and to fit telescopically within a section of the housing passage. The compressive system is a set of one or more resilient elements seated within the housing passage circumferentially about a buffered or unbuffered fiber. Upon assembling the actuating element fully with the terminating element, the compressive system is pressed by the two interfitting elements radially inward to secure the optical fiber in place. The terminating element provides precise centering and alignment of the secured fiber.

More particularly, the terminating element is a hollow body that has an axially extending tubular passage. A shoulder or other radial constriction is closely rearward of a first, forward section of the passage. A second passage section is axially behind the first passage section. The cable length within the second passage section, and correspondingly within the actuating element, typically has the buffer intact. The fiber length within the first passage section is unbuffered in one embodiment, and can, in another embodiment, be buffered. The terminating element preferably has at least one deflectively acting surface for deflecting the compressive system radially inward during assembly.

The actuating element is a tubular member that telescopically seats over the cable being terminated and that assembles within the passage of the terminating element. It is arranged for engagement with the compressive system to press it into mechanical engagement with the optical fiber. In one embodiment, a compressively acting surface on a first forward end of the actuating element abuts the compressive system for deforming it radially inward. The actuating element hence has a tubular passage concentric with the tubular outer surface of the actuating element and adapted to receive the optical fiber, typically with the buffer layer intact. The actuating element can include a lock element for fixing it in an axial, fully assembled position relative to the terminating element. An optional yet preferred feature of the invention provides a second mechanical engagement onto the buffered cable at the back of the actuating element. This second clamp can employ finger-like clamp members on the axial back end of the actuating element and which are pressed onto the buffered cable by sliding interference with the terminating element The compressive system of the illustrated embodiment is disposed within the passage of the terminating element, and arranged circumferentially about the optical fiber, whether buffered or unbuffered. When radially inwardly deformed, the compressive system compressively engages the optical fiber. The compressive system preferably is closely adjacent to the first, forward section of the terminating element and is axially forward of the actuating element. The compressive system can be a single centrally apertured deformable element. Other embodiments can employ a set of two or more compressive elements. In one embodiment, each compressive element is an elastically deformable, resilient material, preferably with a circular cross-section, and the set of one or more of such elements substantially encircles the optical fiber. In operation, the set of compressive elements is radially inwardly compressed, by the terminating element and the actuating element, into mechanical engagement with the buffered or unbuffered optical fiber closely adjacent its entry into the forward passage section. It is understood that the compressive system preferably provides this engagement with a linear relation between the compressive force it receives and the resultant deformation of the system, and without regard to whether the system undergoes a compressive reduction in volume.

According to the method of the invention, a fiber optic cable is seated in the passage of the terminating element. A portion of the fiber, either buffered or unbuffered, extends through the compressive system and through the first forward section of the passage of the terminating element. The compressive system is compressively formed in a radial inward direction by forces created by the axial telescopic assembly of the actuating element with the terminating element. The actuation of the compressive system compresses it into supporting and retaining engagement with the optical fiber. Preferably, the compressive system is maintained in its clamping condition.

The exposed, connecting end of an optical fiber that is secured in a termination in accordance with the invention can be polished in the same manner as conventional in the art for terminations utilizing epoxy and other adhesives.

The foregoing features of the invention, and others described below, provide a fiber optic cable termination that does not require adhesive and yet terminates a fiber optic cable readily and with high reliability. The invention can be practiced economically and hence cost competitively with existing practices and structures, and can provide high quality communication and mechanical performance at least comparable with existing terminations that employ epoxy or other adhesives.

Although the invention thus provides a fiber optic termination that is secure, precise and reliable solely by mechanical action, and applied at room temperature without requiring adhesive, features of the apparatus and of the method of the invention may be used to advantage together with adhesives, and the invention has corresponding scope.

DETAILED DESCRIPTION OF THE DRAWINGS

For a fuller understanding of the nature and objects of the invention, reference should be made to the following detailed description and the accompanying drawings, in which:

FIG. 1 is a cross-sectional side view of an optical fiber termination according to the invention in unassembled form;

FIG. 2 is a view similar to FIG. 1, with the actuating element partially assembled within the terminating element sufficiently to initially deform the compressive system;

FIG. 3 is a side view similar to FIGS. 1 and 2 of the termination fully assembled;

FIG. 4 is a transverse cross-sectional view along line 4—4 of FIG. 1;

FIG. 5 is a transverse cross-sectional view along line 5—5 of FIG. 3;

FIGS. 6, 7 and 8 are perspective views of three different compressive systems in accordance with the invention;

FIG. 9 is a side view, partially cut away, of another fiber optic cable termination according to the invention and in fully assembled form;

Figure 12:
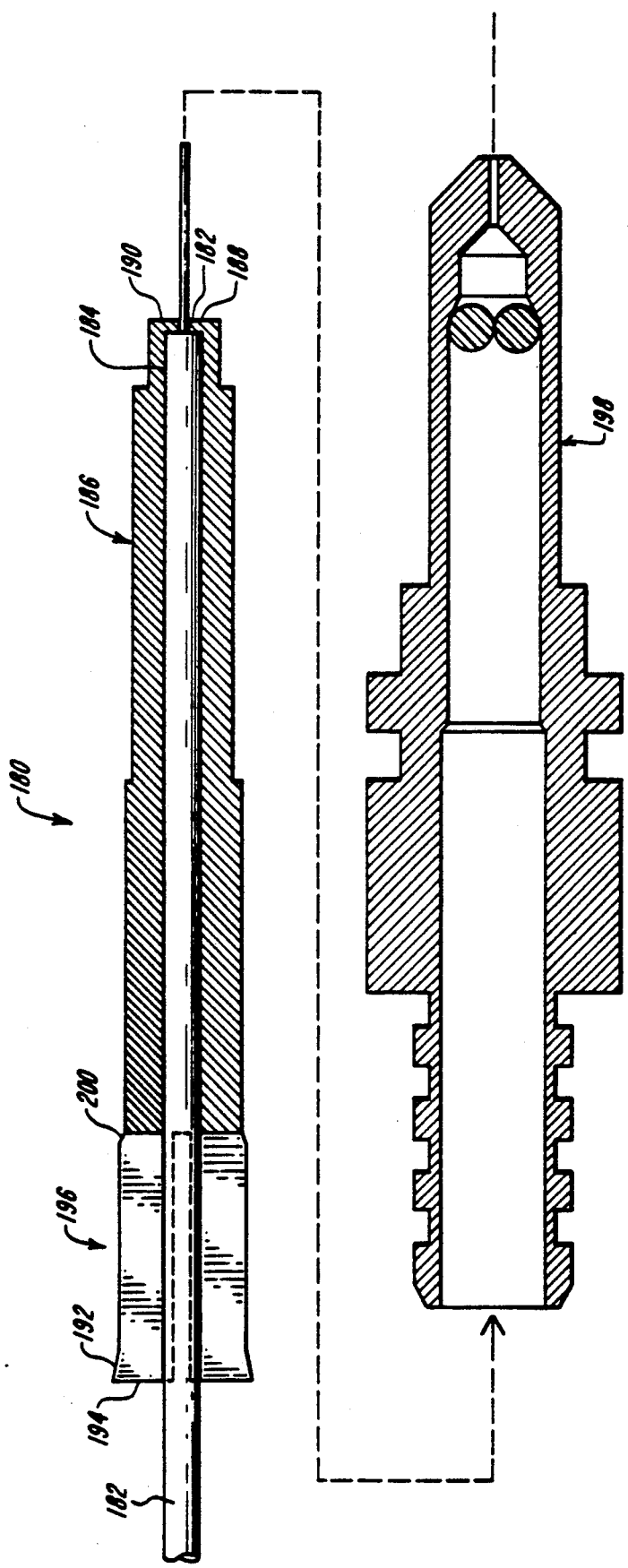

FIG. 10 is a side view, partially cut away, of another fiber optic cable termination, in partially assembled form, according to the invention FIG. 11 is a side view, partially cut away, of a fiber optic cable coupling, including the termination of the present invention, in partially assembled form, including a spring-acting locking element, and FIG. 12 is a view similar to FIG. 1 showing another embodiment of the invention.

DESCRIPTION OF THE ILLUSTRATED EMBODIMENTS

A fiber optic termination 10 according to the invention, shown in FIGS. 1 through 3, has an outer, terminating element 14, an inner, actuating element 12, and a compressive system 16 illustrated as having a set of three compressive elements 17.

The illustrated outer element 14 is a tubular housing body that has an axial through passage 18 concentric about an axis 25 with a forward outer surface 26. The tubular passage 18 has a first section 20, illustrated as dimensioned for receiving and for supporting and positioning an unbuffered optical fiber 60. The first passage section is axially forward of a second passage section 22. This rear passage section 22 is dimensioned to telescopically receive and seat the inner element 12. A radial constriction forms a shoulder or abutment 24 at the back, rear end of the forward passage section 20 and forward of the passage section 22. The illustrated radial constriction is a right circular cone concentric with the axis 25 of the passage 18. The outer surface of the terminating element body is illustrated as having an axial succession of lands 34 and grooves 32 at the axial back end to receive and engage a cable-supporting sheath or sleeve, as conventional. The forward outer surface 26 is structured as a cylindrical plug to seat telescopically in conventional fashion in a mating receptacle termination (not shown), and the central portion 27 of the outer surface is structured to provide conventional mechanical connection with such a receptacle.

The illustrated second passage section 22 has, spaced apart in axial succession, a conical deflecting guide surface 28, an outward step 29, and an optional locking groove 30, all rearward of the radial constriction element 24. The illustrated passage 18 also has a short bore 31 between the elements 24 and 28. The guide surface 28 forms a funnel, preferably with a cone angle in the order of 60°, and having a forward diameter less than the composite diameter of compressive system 16 prior to being compressed. The locking groove 30 is positioned to receive and seat a locking ring 58 carried on the inner element 12, when the termination 10 is completely assembled, as in FIG. 3.

With further reference to FIGS. 1, 2 and 3, the illustrated inner, actuating element 12 has a tubular axial through passage 38 concentrically within a outer surface 40, and has a compressively acting axially forward surface 44. The passage 38 is adapted to receive and support a buffered optical fiber cable 42. The illustrated tubular outer surface 40 has a front section 46 that matingly fits within the terminating element bore 3, a larger middle section 48 that matingly fits within the passage 22 forward of the step 29 and rearward of the guide surface 28, and a still larger back section 50 that matingly fits with the passage 22 behind the step 29. Preferably, the radial steps between the sections 46 and 48, and further between the sections 48 and 50, are located in the fully assembled termination, FIG. 3, in close axial proximity rearward of the guide surface 28 and of the step 29, respectively, of the outer element 14. The illustrated outer surface 40 can also include a locking ring groove 56, located rearward of the step between sections 48 and 50, that seats the expandable locking ring 58.

As partially shown in FIGS. 4 and 5, the outer surface sections 46, 48 and 50 of the actuating element; and the sections 20 and 22 and bore 31 of the passage 18, as well as the forward outer surface 26, all are cylindrical, with circular cross sections, and, together with the fiber passage 68, are coaxial with the axis 25.

The illustrated termination 10, which engages a fiber optic cable with the compressive system 16 at the forward end of the termination, i.e. right-most in FIG. 3, also engages the cable at the rearward end of the termination, i.e. left-most in FIG. 3. This second engagement is provided by clamping members 54, at the rear end of the inner, actuating element 12. These clamping members are actuated by interferingly engaging the walls of passage 18. The illustrated clamping members 54 are formed with a rearmost section 52 on the inner element 12. Section 52 has an enlarged outer diameter, axially rearward of a step 53, illustrated as between the lock-seating groove 56 and the back end of the inner element. The step 53 preferably is gradual, e.g. tapered. Axial slots through the tubular wall of this largest diameter section 52 of the inner element 12, as shown in the upper portion of FIG. 1 and in FIG. 5, form four clamping fingers 54 in the embodiment shown. The enlarged outer diameter of these fingers interferingly fits within the passage 18, to compress the fingers onto the buffered cable as the termination is assembled.

The compressive system 16 of the termination 10 can include a single, centrally apertured deformable element such as the spherical element 17' of FIG. 8 or as the disk element 17" of FIG. 6. The further embodiment of FIGS. 1 through 4 employs a set of three spherical elements 17 arranged in a circle to defined a fiber-receiving hole 68 between them. In other embodiments, the compressive system 16 can include three rod-like elements 17''' as shown in FIG. 7. To ensure that each compressive element 17 maintains substantially uniform holding pressure on an optical fiber or cable, it is preferably constructed of a homogeneous and resiliently pliable, elastomeric material that retains the memory of its undeformed shape. Examples of such a material include nylon, delrin, polyethylene, polypropylene, rubber, and polyvinyl chloride. The initial shape of the elements 17 may be of various configurations per FIGS. 4, 6, 7 and 8, and, preferably, has a circular cross-section, as shown. The fiber passage 68, passing through or among element(s) 17 receives an unbuffered optical fiber 60, as FIG. 2 shows. Prior to compression, the fiber passage 68 has a diameter sufficient to allow free movement of the optical fiber. The size and shape of the fiber passage 68 may be altered by varying the number, diameter, and/or shape of the elements 17. Further, the compressive system 16 Preferably has a tapered opening to the passage 68 to guide insertion and passage of the optical fiber. A system 16 of three spheres provides such a fiber guide, as shown in FIG. 1. If a one-piece compressive system 16 as in FIGS. 6 or 8 is used, it is preferred that the ends of the fiber passage 68 therein be flared to guide the optical fiber as also shown.

FIGS. 1 through 3 illustrate, in sequence, the Process of the invention with a cable connector having the described structure. As shown in the upper portion of FIG. 1, a buffered fiber optic cable 42 is seated within the passage 38 of the inner element 12, and the unbuffered and clad optical fiber 60 of the cable extends beyond the compressively acting surface 44 of the inner element 12. The compressive system 16 is assembled with the cable 42, as by sliding it over the fiber 60 prior to assembly with the outer terminating element 14. An alternative step is to place the compressive system 16 within passage 18 of the outer, terminating element 14 at the forward end of the second passage section 22, as shown in the lower portion of FIG. 1.

The inner element 12 is slidingly telescoped into the outer element 14, as shown in FIG. 2, with the unbuffered optical fiber 60 passing through the clearance hole 68 and through the forward passage section 20 of outer element 14, to project axially beyond the termination element 14. After the termination elements 12, 14 and 16 are partially assembled and aligned in this manner with each other and with the cable 42, further axial assembly of the inner element 12 with the outer element 14 includes compressing the compressive system 16 between the compressively acting surface 44 of inner element 12 and the guide surface 28 of the outer element 14. The guide surface 28 deflects the axial force exerted by compressively acting face 44, causing the compressive system 16 to deform radially inwardly and into initial mechanical engagement with the optical fiber 60.

Further assembly of the two termination elements presses the compressive system 16 axially into the bore 31, with continued compression radially inward onto the fiber 60. The inner and outer elements 12 and 14 thus function like a piston within a cylinder respectively, and compress the set of elements of the compressive system onto the fiber 60.

Concurrently the greater diameter of inner element 12 rearward of step 53 produces a compressive engagement between the inner element 12 section 52 and the outer element 14, and deflects the fingers 54 concentrically inward onto cable 42.

The inner element 12 telescopes into the outer element 14 until locking grooves 30 and 56 are aligned, at which point the locking ring 58 expands and engages the outer groove 30, as shown in FIG. 3. At this point, the assembled compressive system 16 mechanically engages the unbuffered optical fiber 60, for supporting and retaining the fiber 60 in a fixed position relative the outer surface of outer element 14. The passage 18 within the forward section 20 supportingly receives with minimal clearance the optical fiber tip that projects forward of the compressive system to align and position it with precision. Further, the compressively acting clamping fingers 54 secure the buffered clad optical cable 42 to the assembled termination elements 12 and 14.

The projecting optical fiber 60 is trimmed and polished, as known in the art, to complete the termination of the cable 42.

As also known in the art, a sleeve (not shown) may be positioned over the buffered optical cable 42, after final assembly of the termination 10, such that a portion extends over the lands 34 and grooves 32 of the outer terminating element 14. The sleeve may then be crimped or otherwise secured in position.

It will now be apparent that the assembly procedure requires only axial telescoping of the elements 12 and 14 together, and requires no threading or rotating of one element relative to the other or relative to the optical fiber. The only force or stress to which the exposed fiber 60 is thus subjected is radial compression by the compressive system 16.

FIG. 9 shows another termination 70 according to the invention that secures a buffered optical cable 72 in the manner described above with reference to FIGS. 1 through 8, except that the entire length of the fiber is buffered and a compressive system 74 is radially compressed onto the buffered cable, instead of onto an unbuffered fiber as in FIGS. 1 through 8. The termination 70 has an outer termination element 76 that telescopically receives an inner, actuating element 78 to press the compressive system 74 onto the cable. The terminating element 76 accordingly has a forward passage section 80 that supportingly receives and locates the buffered cable. The remaining structure and its function, and the termination method, for this embodiment can be in accord with the preceding description of the termination 10.

FIG. 10 shows another termination 82 according to the invention that secures an unbuffered optical fiber 84 in the manner described above with reference to FIGS. 1 through 8, except that a forward passage section 86 is formed using a ferrule 88. The ferrule 88 can be fabricated of a ceramic, stainless steel, or other suitable material familiar to those of ordinary skill in the art. The termination 82 has an outer termination element 90 that telescopically receives an inner, actuating element 92 to press a compressive system 94 onto the fiber 84. Termination element 90 includes a tubular housing body 98 and the ferrule 88. Tubular housing body 98 provides tubular passage 100 having a deflecting guide surface 102 and a forward short bore 104. The forward passage section 86 and outer diameter 106, of ferrule 88, are coaxial with an axis 108 of tubular passage 100. In addition to forward passage section 86, the ferrule 88 provides a radial constriction element 110. The termination element 90 is fabricated by securing the housing body 98 and the ferrule 88 together typically by press fitting, although other techniques including adhesive and molding can be used.

The termination 82 shown in FIG. 10 also includes a coupling element, illustrated as a freely-rotatable threaded coupling receptacle 99, on the terminating element 90. The illustrated receptacle 99 has an internally threaded bore 101 for threadably seating a mating plug (not shown), and has a retaining collar 103. The collar projects radially inward to seat the receptacle on the element 90, and is secured between protruding flange 105 on the element 90 and a snap ring 107 seated in a groove 109. The remaining assembly, structure and its function, for this embodiment can be in accord with the preceding description of the termination 10.

FIG. 11 shows a bayonet-type coupling 122 including a termination element 130, a locking nut 124, a compression spring 125, a C-clip 127, and a strain relief boot assembly 126. The termination 130 secures an unbuffered optical fiber 132 in the manner described above with reference to FIGS. 1 through 3. The spring 125 biases the locking nut 124 against the C-clip 127. Also, threaded or snap-lock couplings such as those disclosed in U.S. Pat. No. 4,872,736, issued to Myers et al., and in HIGH PERFORMANCE PUSH-PULL COUPLING SINGLE FIBER CONNECTORS AND PLUG-IN FIBER-OPTIC CONNECTORS, Sugita et al., Review of the Electrical Communications Laboratories, Vol. 35, No. 5, pp. 529–533 (1987) both incorporated herein by reference, can be used with the termination element 130 to provide a means for coupling optical fibers.

In FIG. 11, the forward passage section 144 of termination 130 is formed using a ferrule 135 as described in FIG. 10. The termination 130 has an outer termination element 134 that telescopically receives an inner, actuating element 136 to press a compressive system 138 onto the fiber 132. FIG. 11 shows the termination element 130 partially assembled; when fully assembled the elements are positioned in the manner described above with reference to FIG. 3. The termination element 134 includes a tubular housing body 140 and the ferrule 135. The tubular housing body 140 provides a tubular passage 146 having a deflecting guide surface 148 and a forward short bore 150.

Ferrule 135 has a forward passage section 144 and outer dimension 154 which are coaxial with a central axis 156 of tubular passage 146. In addition, ferrule 135 provides radial constriction element 157. The forward portion of tubular housing body 140 includes, on the outer surfaces, a flange 152 which provides a forward seating face 153 for the spring 125. The flange 152 also includes an alignment guide flange 155 which assists to align the termination 130 in a mating coupling (not shown). The rearward portion of the tubular housing body 140 includes a locking groove 172 for receiving a C-clip 127.

The locking nut 124 of FIG. 11 includes a forwardly extending cylindrical section 158, a rearwardly extending cylindrical section 160 and a inwardly extending flange 162. Flange 162, which has a circular aperture concentric around the axis 156, receives the termination element 130 and provides a rear seating face 164 for the spring 125. The inner and outer surfaces of the cylindrical section 158 are concentric around the axis 156 and the outer surface can be tapered, as shown. The illustrated locking nut 124 is of the bayonet type known in the art and accordingly is lanced with hook-shaped cut-outs (not shown) for engaging nubs on the surface of a mating bayonet (not shown). Alternatively, the locking nut can have a threaded inner surface to engage complementary external threads on the coupling junction.

To assemble the coupling 122 of FIG. 11, the strain relief boot assembly 126, including heat shrink sleeve 168 and crimp sleeve 166, are slipped over a stripped optical fiber 170. Next, the termination element 130 having the spring biased locking nut 124 thereon is assembled as previously described. The jacket 174 of the optical fiber 170 is then positioned over the lands and grooves of the termination element 130. In a further step, the crimp sleeve 166 and the heat shrink sleeve 168 are moved along the buffered fiber around the rear portion of termination element 130 and over the jacket 174, crimped and shrunk into place.

Post-assembly processing of the termination 122 includes clipping and polishing the fiber. A typical post-assembly processing method is disclosed in OPTICAL CABLE TERMINATION PROCEDURES published by the assignee of the present invention and incorporated herein by reference. As described therein, the fiber is clipped by scribing the exposed projecting fiber and pulling the fiber along its axis to sever it. The forward end of the termination element, with the clipped fiber extending therefrom, typically is then inserted into a polishing disk and passed over an abrasive film, e g , one formed of aluminium oxide, to polish the fiber facet. As also known in the art, the end of the termination element, and hence the fiber facet, can be made optically flat, or given a selective radius, by selection of the proper polishing disk.

FIG. 12 shows another termination 180 according to the invention that secures a fiber optic cable 182 in the manner described above with reference to FIGS. 1 through 8. In this embodiment, the locking grooves and locking ring are eliminated from the inner, actuating element 186 and outer, terminating element 198. The passage 184 of the inner element 186 preferrably has a cylindrical bore extending its full length except for an annular lip 188 projecting radially inward from the cylindrical bore at the exit end, i.e., at the end adjacent to the forward surface 190. This lip provides a circular abutment that the fiber cladding abuts for positioning purposes when the fiber is fully assembled within the inner element 186. Further, in this embodiment, the clamping members 194 act to secure the fiber optic cable 182. As illustrated, the clamping members 194 are formed of a rearmost section 196 on the element 186. The section 196 has an enlarged outer diameter, axially rearward of a step 200, illustrated as about three-quarters of the way from the forward surface 190 to the back, i.e., left, end of the inner element. The inner element 186 preferably includes a rearwardly located tapered flare 192 on rearmost section 196. The flare 192 increases the interference grip of the inner element 186 on the fiber optic cable 182 and with the outer element 198. In one illustrative embodiment, the radial step 200 is in the order of one or a few thousandths of an inch and the radial flare 192 is slightly larger, i.e., in the order of five thousandths of an inch.

It will thus be seen that the invention efficiently attains the objects set forth above. In particular, the invention provides a termination assembly that is readily installed without requiring heat or adhesives, and that is substantially immune to environmental conditions. This apparatus and the method of the invention hence can provide a high performance, mechanically secured termination for optical fibers, without damaging the light transmissive path.

It will be understood that changes may be made in the above constructions and in the foregoing steps and sequences of operation without departing from the scope of the invention. It is accordingly intended that all matter contained in the above description or shown in the accompanying drawings be interpreted as illustrative rather than in a limiting sense.

Having described the invention, what is claimed as new and secured by Letters Patent is:

1. Apparatus for terminating a fiber optic cable by mechanical engagement, said apparatus comprising A. a terminating element having a passage extending axially therethrough, said passage having a first forward section axially forward of and coaxial with a second rearward section, said passage being adapted for receiving an optical fiber extending axially therein with a forward portion of said optical fiber extending within said forward section, B. a compressive system disposed, within a forward portion of said second passage section, circumferentially about said forward portion of said optical fiber, said compressive system being compressible at least in part with substantially a linear relation between compressive force and deformation and being radially inwardly deformable into engagement with said optical fiber, and C. selectively movable actuating means movably seated relative to said terminating element and arranged for radially inwardly deforming said compressive system within said passage into engagement with said forward portion of said optical fiber.

2. Apparatus according to claim 1 further comprising radially-acting clamping means for selectively radially-inwardly engaging the optical fiber within a rearward portion of said second passage section.

3. Apparatus according to claim 1 in which said first passage section is arranged for telescopically receiving and supporting and locating an unbuffered optical fiber.

4. Apparatus according to claim 1 in which said first passage section is arranged for telescopically receiving and supporting and locating a buffered optical fiber cable.

5. Apparatus according to claim 1 in which said compressive system includes a set of at least one elastically deformable plastic element seated within said terminating element passage radially outward from a fiber-receiving axial passage.

6. Apparatus according to claim 5 in which said compressive system comprises a single element of said elastically deformable resilient material having an aperture therethrough for forming said fiber-receiving passage.

7. Apparatus according to claim 5 in which said compressive system comprises a plurality of substantially identical compressive elements, each of said elastically deformable resilient material, seated within said second passage section.

8. Apparatus according to claim 1,

A. further comprising radially extending shoulder means within said passage located axially between said first and second passage sections for disposition in abutment with said compressive system, and B. in which said actuating means is selectively movable relative to said shoulder means for compressing said compressive systems therebetween to effect said inward deformation.

9. Apparatus according to claim 8,

A. in which said actuating means has a radially-extending actuating surface for disposition in abutment with said compressive system at least partially in opposition to said shoulder means, and B. in which at least one of said shoulder means and said actuating surface is angled for deflecting said compressive system radially inward during inward during said inward deformation.

10. Apparatus according to claim 8 in which said compressive system comprises centrally apertured elastically deformable resilient material seated within said passage with said aperture thereof coaxial with said passage axis and in abutment with said should means, and elastically deformable radially inward in response to compression by said actuating means.

11. Apparatus according to claim 1 in which said actuating means comprises a tubular element sildeably sated within on said passage section.

12. Apparatus according to claim 11 further comprising means for securing said tubular element of said actuating means in a selected location relative to said passage of said terminating element.

13. Apparatus according to claim 11
A. in which said tubular element has an outer surface with a third forward section axially forward of and coaxial with a fourth rearward section, said tubular element being arranged for telescopically fitting with in said second passage section of said terminating element,
B. said tubular element having resilient clamping means at said fourth rearward section arranged for slidingly interferingly engaging said rearward portion of said second passage section for effecting said compressive radially inwardly engaging clamping of an optical fiber within said second passage.

14. Apparatus according to claim 1
A. further comprising radially-extending should means within said passage for disposition in abutment with said compressive system,
B. in which said actuating means comprises a tubular element slideably seated within one said passage section and having an actuating surface for disposition in abutment with said compressive system at least partially opposite said should means, said actuating means being movable relative to said shoulder means for compressing said compressive system therebetween to effect said inward deformation, and
C. at least one of said shoulder means and said actuating surface being angled for deflecting said compressive system radially inward during said inward deformation thereof.

15. Apparatus according to claim 1
A. in which said actuating means comprises a tubular element slideably seated within said rearward passage section, and
B. in which said tubular element of said actuating means includes radially acting clamping means for disposition within said passage for selective radially inward engagement with a buffered optical fiber within said rearward passage section concurrent with said inward deformation of said compressive system.

16. Apparatus according to claim 1 further comprising coupling means for removably and replacably connecting said apparatus with a mating optical fiber device.

17. Apparatus for terminating an fiber optic cable by mechanical engagement and comprising
A. an inner element having an axially extending tubular passage therethrough concentrically with in a tubular outer surface, said inner passage being adapted for receiving a buffered optical fiber and having a compressively acting surface at a first forward end,
B. an outer terminating element having an axially extending tubular passage therethrough with radial constriction means between a first forward passage section for receiving an optical fiber and a second passage section in which said inner element is telescopically movably received, and
C. a compressive system disposed in said second passage section of said outer terminating element axially forward of said compressively-acting surface and encircling an optical fiber received in said passage of said inner terminating element, said compressive system being compressive at least in part with substantially a linear relation between compressive force and deformation, and deforming, upon compression between said constriction means and said compressively-acting surface, for compressively engaging the optical fiber.

18. Apparatus according to claim 17 wherein said inner terminating element further comprising compressively-acting clamping means at a rearward end for mechanically engaging the buffered fiber optical cable.

19. Apparatus according to claim 17 wherein said tubular passage of said outer element further comprises a second deflectively acting surface, rearwardly axially spaced from said first deflectively acting surface, for partially deflecting said compressive system radially inward.

20. Apparatus according to claim 17 wherein said outer terminating element comprises ferrule means forming said radial constriction means and said first forward passage section.

21. A method for terminating a fiber optical cable comprising the step of compressively deforming a compressive system, that encircles a portion of the cable, by axially telescoping an inner terminating element, so as to mechanically compressively engage said portion of said cable, and wherein said compressive system is compressible at least in part with a linear relation between compressive force and deformation.

22. The method according to claim 21
A. wherein said compressive deforming of said compressive system engages said fiber optical cable adjacent a forward end of the outer terminating element, and
B. comprising the further step of mechanically engaging a buffered portion of said cable adjacent a rear end of the outer terminating element current with said compressive deforming.

23. A method according to claim 21 further characterized
A. said compressive system is compressible at least in part with a linear relation between compressive force and deformation in that said deforming step includes compressing said compressive system only within said linear relation between force and deformation.

24. A method for terminating a fiber optic cable by mechanical engagement, said method comprising the steps of
A. providing a terminating element having axially-forward wall means and having an axially extending tubular passage therethrough, and wherein said passage is arranged for receiving an optical fiber extending tubular passage therethrough, and wherein said passage is arranged for receiving an optical fiber extending axially therein with a portion of said fiber extending from within said passage at said forward wall means,
B. providing a compressive system disposed with in said passage for substantially encircling said portion of said optical fiber closely adjacent the passage thereof through said forward wall means, said compressive system being radially inwardly deformable at least in part with a substantially linear relation between compression force and deformation, C. seating a buffered optical fiber extending axially within said passage with a portion of said optical fiber extending from within said passage through said forward wall means, and D. deforming said compressive system, using axially applied forces, radially inward into supporting and retaining engagement with said portion of said optical fiber closely adjacent to the passage thereof through said forward wall means.

* * * * *

UNITED STATES PATENT AND TRADEMARK OFFICE
CERTIFICATE OF CORRECTION

PATENT NO. : 5,208,887
DATED : May 4, 1993
INVENTOR(S) : Soren Grinderslev

It is certified that error appears in the above-indentified patent and that said Letters Patent is hereby corrected as shown below:

Column 11, claim 11, line 2, "sildeably" should be --slideably--.
line 3, "on" should be --one--.
Column 12, claim 21, line 4, --within an outer terminating element-- should be inserted between "element" and "so"--.

Signed and Sealed this

Seventeenth Day of May, 1994

Attest:

BRUCE LEHMAN

*Attesting Officer*           *Commissioner of Patents and Trademarks*